United States Patent
Schmieder et al.

(10) Patent No.: US 9,100,595 B2
(45) Date of Patent: Aug. 4, 2015

(54) IMAGE PROCESSING METHOD AND THERMAL IMAGING CAMERA

(75) Inventors: Matthias Schmieder, Freiburg (DE); Martin Stratmann, Freiburg (DE)

(73) Assignee: Testo AG, Lenzkirch (DE)

( * ) Notice: Subject to any disclaimer, the term of this patent is extended or adjusted under 35 U.S.C. 154(b) by 247 days.

(21) Appl. No.: 13/638,677

(22) PCT Filed: Mar. 12, 2011

(86) PCT No.: PCT/EP2011/001229
§ 371 (c)(1),
(2), (4) Date: Oct. 1, 2012

(87) PCT Pub. No.: WO2011/124309
PCT Pub. Date: Oct. 13, 2011

(65) Prior Publication Data
US 2013/0028477 A1      Jan. 31, 2013

(30) Foreign Application Priority Data
Mar. 30, 2010   (DE) .................. 10 2010 013 377

(51) Int. Cl.
*G06K 9/03* (2006.01)
*H04N 5/33* (2006.01)
*G06T 7/20* (2006.01)
*H04N 5/14* (2006.01)
*H04N 5/232* (2006.01)

(52) U.S. Cl.
CPC *H04N 5/33* (2013.01); *G06T 7/204* (2013.01); *H04N 5/145* (2013.01); *H04N 5/23254* (2013.01); *G06T 2207/10016* (2013.01); *G06T 2207/10048* (2013.01)

(58) Field of Classification Search
CPC ..... H04N 5/33; H04N 5/145; H04N 5/23254; G06T 7/204; G06T 2207/10016; G06T 2207/10048; G06T 2207/10032
See application file for complete search history.

(56) References Cited

U.S. PATENT DOCUMENTS

| 6,075,903 | A  | * | 6/2000 | Breiter et al. ................ 382/261 |
| 6,612,403 | B2 | * | 9/2003 | Silberhorn et al. ........... 187/394 |
| 6,985,172 | B1 | * | 1/2006 | Rigney et al. ................. 348/149 |

(Continued)

FOREIGN PATENT DOCUMENTS

| JP | 2001007987 A | 1/2001 |
| JP | 2004520878 A | 7/2004 |

(Continued)

OTHER PUBLICATIONS

Yafeng Yin, et al., "Adaptive Mean Shift for Target-Tracking in FLIR Imagery", Wireless and Optical Communications Conference, 2009. WOCC 2009, 18th Annual, IEEE, Piscataway, NJ, USA, May 1, 2009, pp. 1-3.

*Primary Examiner* — Chan Park
*Assistant Examiner* — Mia M Thomas
(74) *Attorney, Agent, or Firm* — Volpe and Koenig, P.C.

(57) ABSTRACT

For a thermal imaging camera (1), features are extracted from a series of at least two infrared images (10, 11) or visible images (19, 20) associated therewith by a feature analysis, and an optimal correspondence between features extracted from the images (9, 10, 19, 20) is determined, and a translation vector (18) that relates the pixels of the first infrared image (10) to pixels of the second infrared image (11) is determined for the image positions (16, 17) of the corresponding features.

9 Claims, 4 Drawing Sheets

(56) References Cited

U.S. PATENT DOCUMENTS

| | | | |
|---|---|---|---|
| 7,016,550 B2* | 3/2006 | Alderson et al. | 382/274 |
| 7,035,475 B1* | 4/2006 | Chen et al. | 382/254 |
| 8,179,442 B2* | 5/2012 | Ikeda | 348/164 |
| 2002/0112926 A1* | 8/2002 | Siberhorn et al. | 187/394 |
| 2004/0076316 A1* | 4/2004 | Fauci | 382/128 |
| 2004/0201706 A1* | 10/2004 | Shimizu et al. | 348/208.4 |
| 2006/0227218 A1* | 10/2006 | Kondo et al. | 348/208.1 |
| 2006/0228100 A1* | 10/2006 | Ignatowicz | 396/153 |
| 2006/0245617 A1* | 11/2006 | Shan et al. | 382/103 |
| 2009/0086027 A1* | 4/2009 | Chaykin et al. | 348/169 |
| 2009/0185266 A1* | 7/2009 | Stromberg et al. | 359/356 |
| 2009/0257679 A1* | 10/2009 | Hogasten | 382/275 |
| 2010/0118137 A1* | 5/2010 | Avila et al. | 348/125 |
| 2010/0157056 A1* | 6/2010 | Zohar et al. | 348/144 |
| 2011/0096148 A1* | 4/2011 | Stratmann | 348/46 |
| 2011/0199489 A1* | 8/2011 | Fischer et al. | 348/164 |

FOREIGN PATENT DOCUMENTS

| | | |
|---|---|---|
| JP | 2005229494 A | 8/2005 |
| JP | 2007129587 A | 5/2007 |

* cited by examiner

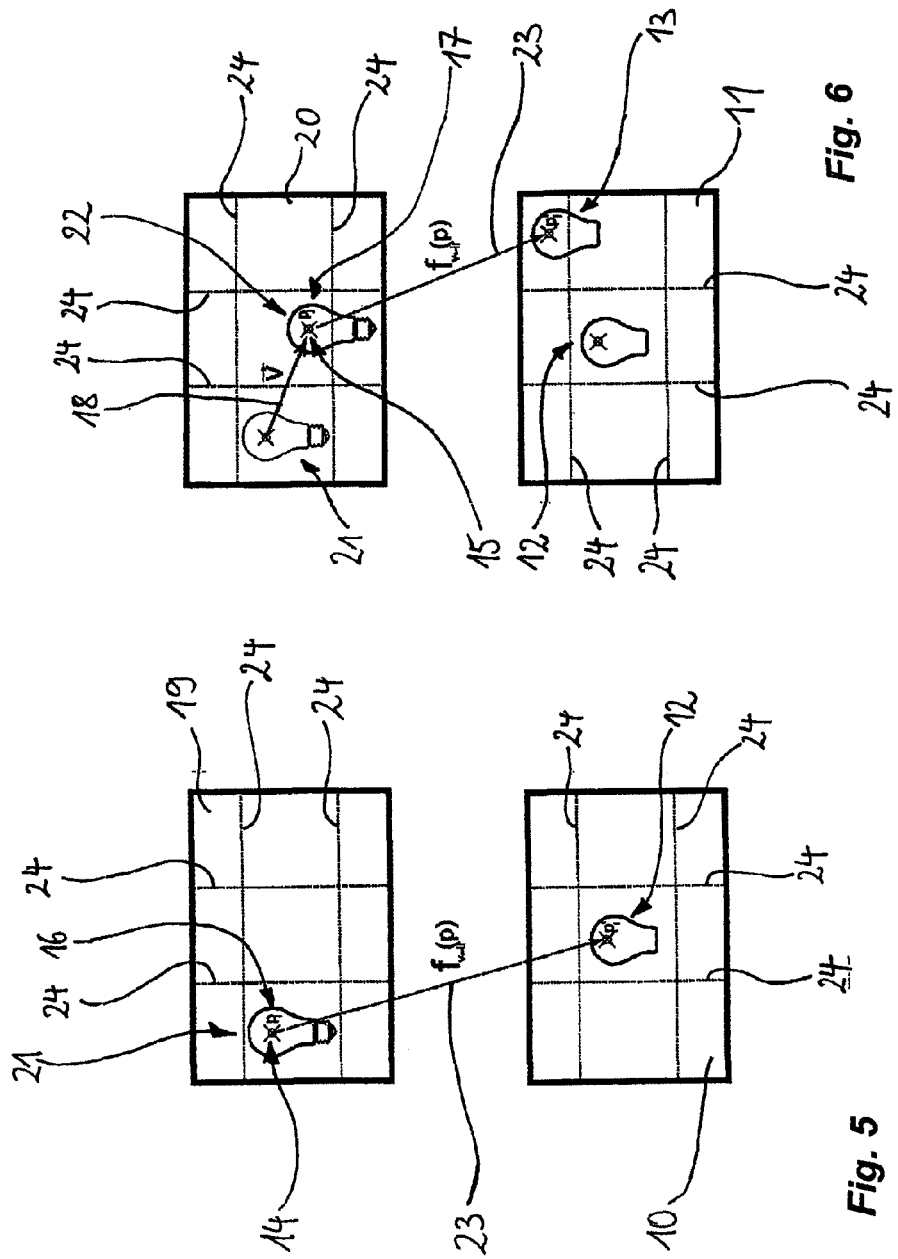

IMAGE PROCESSING METHOD AND THERMAL IMAGING CAMERA

BACKGROUND

The invention relates to an image processing method for a sequence of IR images, the sequence comprising at least a first IR image and a second IR image, the first IR image being assigned to a first instant, and the second IR image being assigned to a second, later instant.

The invention further relates to a thermal imaging camera having image processing means.

It has become customary to produce a sequence of IR images of a scene, for example in the form of a film, in order to document laterally proceeding processes, or to carry out long term measurements.

It has emerged that there is a particular difficulty in the case of handheld thermal imaging cameras in accurately aiming at small objects and acquiring them over a lengthy period. It is therefore to be recommended for such thermal imaging cameras to be mounted on stands or the like during the measurement period.

SUMMARY

It is the object of the invention to simplify measurements with a thermal imaging camera that extend over a lengthy measurement period.

In order to achieve this object, the invention provides in the case of an image processing method of the type mentioned at the beginning that a first image of a scene is produced at a first instant, in that a second image of the scene is produced at a second instant, in that a first image region is selected in the first image, in that at least one feature is extracted from the first image for the first image region, in that a second image region is determined and selected in the second image with the aid of a feature and/or pattern recognition algorithm in such a way that for the selected second image region the correspondence of at least one extracted feature to the at least one feature extracted in relation to the first image region is optimal, and in that there is determined by a comparison of the image position of the first image region in the first image with the image position of the second image region in the second image a translation vector that relates at least one pixel of the first IR image to at least one pixel in the second IR image. The invention therefore offers the advantage that a scene which seems to be moving on the recorded IR images because of an uncontrolled self-movement of the recording apparatus, that is to say the thermal imaging camera, or if it is actually moving can be tracked over several IR images. This movement can therefore be compensated with the aid of the determined translation vector, thus rendering it possible to make long term measurements over a few seconds or longer in a simple manner.

A structurally particularly simple embodiment can provide the use of the first IR image as first image, and the second IR image as second image.

When the thermal imaging camera used additionally has a VIS camera, it can thus also be provided that the first image and the second image are recorded in the visible spectral region. The invention therefore avails itself of the knowledge that the feature extraction for VIS imaging can be carried out more easily.

If the IR images are not used as first or second image, it can be provided that the translation vector is determined by applying a prescribed correspondence between the pixels of the image produced at an instant and the pixels of the IR image assigned to this instant. Consequently, the prescribed correspondence defines a rule as to how it is possible for the IR images to be superposed with the respectively associated images.

In order to be able to detect an optimal correspondence of the features, it is possible to define and provide a probability function, an optimal correspondence being detected when the probability function exceeds a prescribed threshold value.

The inventive image processing method can, in particular, be applied to sequences of IR images that are formed from frames of a film sequence.

In order to achieve the shortest possible processing intervals it is possible to provide that the selection of the second image region is executed simultaneously with the recording of further IR images of the sequence.

In general, the selected image regions can be designed to be punctiform or extending in plane fashion.

In order to enable the measurement and/or observation of an object over several IR images of a film sequence, it can be provided that the sequence comprises a third IR image, the third IR image being assigned to a third instant that is later in time than the second instant, in that a third image of a scene is produced at the third instant, in that there is selected in the second image a new first image region that is derived from the previously determined second image region of the second image, in that for the new first image region at least one feature is extracted from the second image, in that a new second image region is determined and selected in the third image with the aid of a feature and/or pattern recognition algorithm in such a way that for the selected new second image region the correspondence of at least one feature to the at least one feature extracted in relation to the new first image region is optimal, and in that there is determined by a comparison of the image position of the new first image region in the second image with the image position of the new second image region in the third image a new translation vector that relates at least one pixel of the second IR image to at least one pixel in the third IR image. The new first image region in the second image is preferably selected to be identical to the second image region of the second image in the first method step, or a new second image region is selected by taking account of the initially determined translation vector, particularly by taking account of the movement of the object. It can therefore be prevented that the respectively selected and evaluated image regions jump between the images of the film sequence, the result being to enable continuous acquisition of an object over the course of several images.

It can also be provided that the new first image region is derived from the previously determined second image region by taking account of a temperature change between two pixels of two IR images related by a translation vector. It is advantageous here that the movement or development of an object can also be tracked when its temperature changes in the course of time and the shape, brightness and/or the contrast varies because of these temperature changes.

In order to carry out long term temperature measurements, it can be provided that a sequence of at least two, in particular at least three, temperature values is determined and output from the respective IR images in relation to pixels related by translation vectors. Alternatively or in addition, it can also be provided that a sequence of at least one temperature difference value, in particular at least two temperature difference values, is determined and output in relation to the respective IR images from pixels related by translation vectors.

In order to compensate perspective distortions, it can be provided that the first and second images and/or the IR images are rectified. This rectification is preferably carried out before the feature extraction and/or the selection of image regions. Here, rectification is understood to mean an image processing procedure in which the perspective distortions of a picture of an actually flat scene are corrected. It is advantageous here that an optimal correspondence of features can be determined more easily and with fewer errors after the rectification.

It can be provided that the superposition of the first IR image is generated and/or output with the second IR image shifted relative to the first IR image by the translation vector. It is therefore possible for temporal changes to the recorded objects in the IR images to be represented or displayed in a simple way.

In order to achieve the object, it is provided in the case of a thermal imaging camera of the type mentioned at the beginning that the image processing means are set up to execute an inventive image processing method. For this purpose, the image processing means can have a data processing device with an operating program, the operating program being programmed in such a way that the inventive image processing method is executed with the aid of the operating program.

It is particularly advantageous when the thermal imaging camera is designed as a handheld thermal imaging camera, and/or has a display unit for outputting the IR images and/or VIS images.

BRIEF DESCRIPTION OF THE DRAWINGS

The invention will now be described with the aid of an exemplary embodiment, but is not limited to this exemplary embodiment. Further exemplary embodiments follow from combination of individual or several features of the patent claims one among another, and/or with individual or several features of the exemplary embodiment.

In a partially simplified illustration,

FIG. 5 shows a first image processed with the aid of a further inventive image processing method, and a first IR image, and FIG. 6 shows a second image processed with the aid of the image processing method from FIG. 5, and a second IR image.

DETAILED DESCRIPTION OF THE PREFERRED EMBODIMENTS

Figure 1:
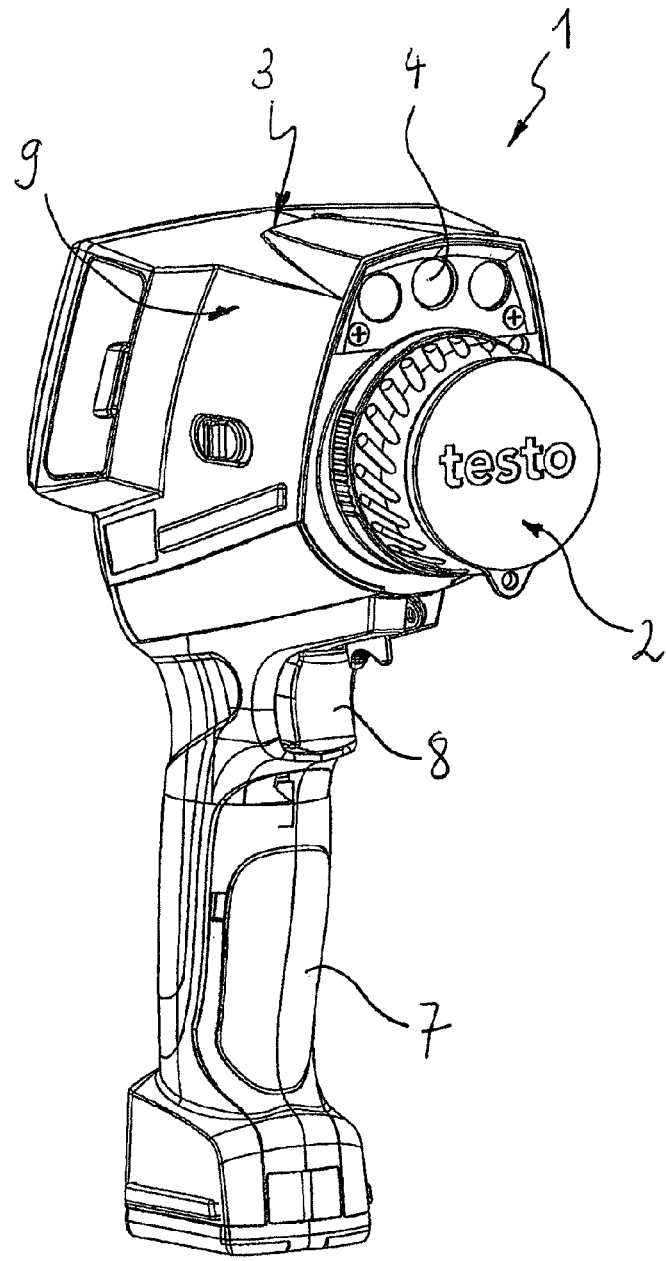
FIG. 1 shows an inventive thermal imaging camera in a perspective view from the front.
Figure 2:
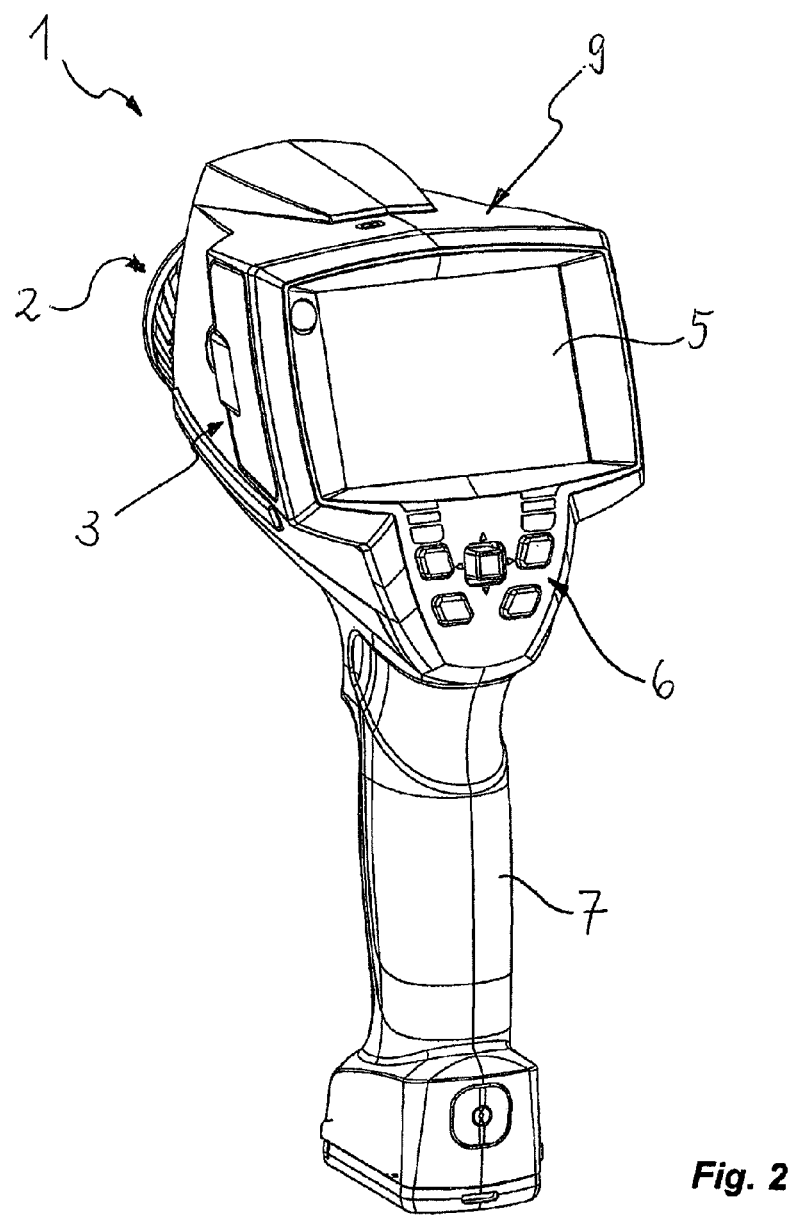
FIG. 2 shows the thermal imaging camera in accordance with FIG. 1, in a perspective view from behind.

An inventive thermal imaging camera 1 shown in FIG. 1 and FIG. 2 has an IR optics 2 behind which there is arranged in a manner known per se an IR sensor arrangement 3 (not further visible) for recording IR images.

The thermal imaging camera 1 further has a VIS camera 4 that is set up to record VIS images.

The recorded IR or VIS images can be represented individually or in a superposed or faded-over fashion on an indicator unit 5 designed as a display, it being possible to select or vary the form of representation with the aid of control elements 6. Temperature values measured at the corresponding image positions can be faded into the images represented.

As handset, the thermal imaging camera 1 is provided with a grip 7, a trigger 8 for recording IR images or VIS images being arranged and set up in the gripping area of the grip 7.

The energy required for operating the thermal imaging camera 1 is provided by a power supply unit integrated in the grip 7 or generally in the thermal imaging camera 1. Image processing means 9 that comprise a data processing unit and are not further visible are constructed in the thermal imaging camera 1.

Stored in the data processing unit is an operating program whose program steps implement an inventive image processing method, which is to be described in more detail below.

Figure 3:
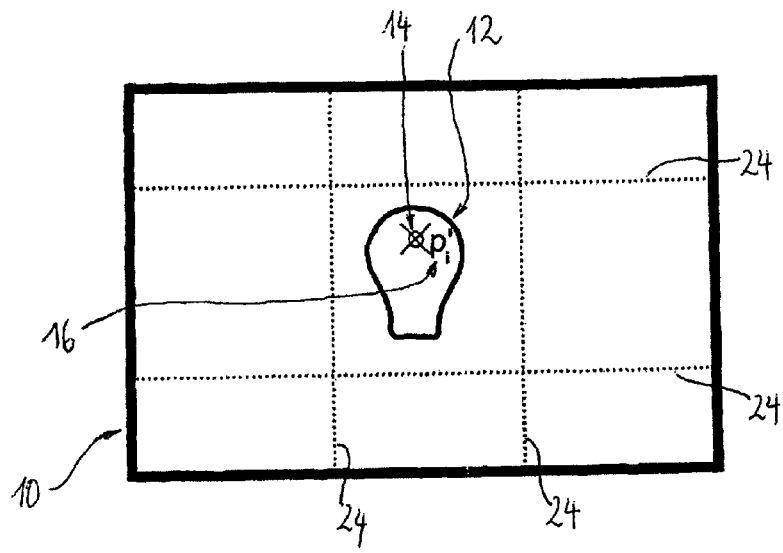
FIG. 3 shows a first IR image processed with the aid of an inventive image processing method.
Figure 4:
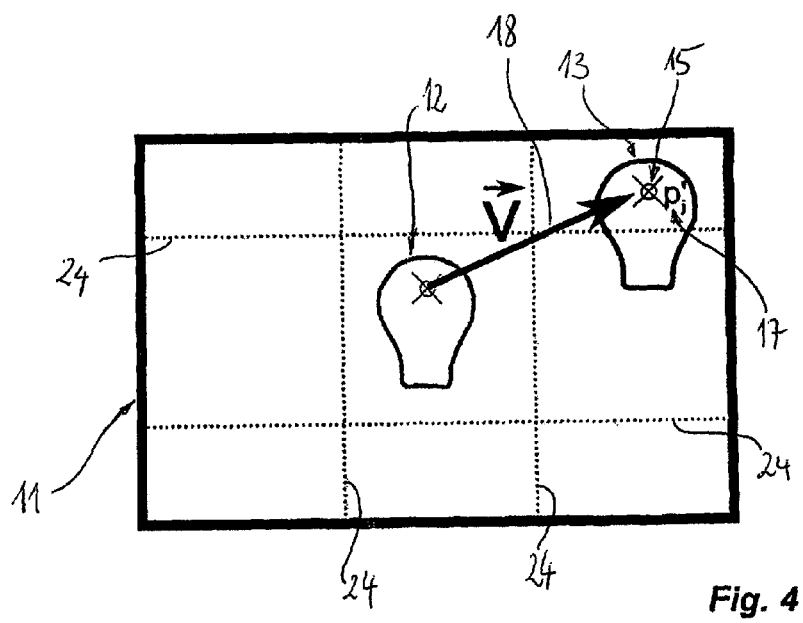
FIG. 4 shows a second IR image processed with the aid of the image processing method from FIG. 3.

Shown in FIG. 3 and FIG. 4 in a highly schematic fashion intended to explain the principle of the invention are a first IR image 10 and a second IR image 11 of a sequence of IR images recorded with the aid of the IR sensor arrangement 3. The IR images 10 and 11 include different pictures 12 and 13 of an object of a scene, the picture 12 from the first IR image 10 being repeated in the second IR image 11 in order to explain the principle of the invention.

It is therefore to be seen from the comparison of FIGS. 3 and 4 that the thermal imaging camera 1 and the scene containing the object have moved in comparison to one another between the recordings.

In order to be able to compensate or track this movement, there is selected in the first IR image 10 a first image region 14, for which a feature (not further visible) is extracted from the first IR image 10. This selection can be performed manually, for example with the aid of the control elements 6 or in an automated fashion by identifying significant features. It is possible here to extract as feature any feature that can be used or is known in image processing, for example an edge or other geometric structure, a distribution of brightness or color, screen content or the like. Subsequently, a second image region 15 is determined and selected in the second IR image 11 in such a way that for the selected second image region 15 the correspondence of at least one extracted feature to the at least one feature extracted in relation to the first image region 14 is optimal.

The first step here is to extract in relation to the second IR image a multiplicity of features from a multiplicity of image regions, and a search is made for that feature which best corresponds to the feature extracted from the first IR image 10. That image region from which this feature has been extracted is then selected as second image region 15.

It is possible here to use a probability function with the aid of which the features are evaluated, an optimal correspondence of features being indicated when a prescribed threshold value is exceeded by the probability function.

A translation vector 18 is now determined by comparing the image positions 16 and 17 assigned to the first image region 14 and the second image region 15, in particular by subtraction.

This translation vector 18 relates the pixels 16, 17 and also the remaining pixels of the IR images 10, 11 to one another in such a way that by shifting the IR images 10, 11 relative to one another by the translation vector 18 it is possible to superpose the pictures 12, 13 approximately or even exactly.

Temperature values that reproduce a temporal change in the temperature of the recorded object can now be derived for the image positions 16, 17 from the IR images 10, 11.

The inventive image processing method can now be continued using a third IR image (not shown further) in such a way that the second image region 15 of the second IR image 11 is used as new first image region.

It is possible, furthermore, to use the determined translation vector 18 to display the IR images 10, 11 on the indicator unit 5 shifted in a faded-over or superposed fashion relative to one another in such a way that the pictures 12, 13 are superposed.

A further inventive method is shown in FIG. 5 and FIG. 6 in greatly simplified schematic representations. Here, components that are designed in a fashion identical to the method previously described are provided with the same reference symbols and not described separately once again.

In a departure from the method previously described, in the case of these methods a first VIS image 19 is recorded simultaneously, or virtually simultaneously, with the first IR image 10 and, respectively, a second VIS image 20 is recorded simultaneously, or virtually simultaneously, with the second IR image 11.

The VIS images 19, 20 include VIS pictures 21, 22, recorded in the visible spectral region, of the object or the scene, which object or which scene is also reproduced with the pictures 12, 13 in the IR images 10, 11.

Here, as well, the VIS picture 21 from the VIS image 19 has been represented in the second VIS image 20 in order to explain the principle, although this need not necessarily be included in the second VIS image 20.

A first image region 14 for which a feature is derived from the first VIS image 19 is then selected in the first VIS image 19.

The selection of the first image region 14 can be performed in the case of the invention manually or in an automated fashion by determining an optimally suitable image region.

Subsequently, as already described with respect to FIGS. 3/4, but now in the second VIS image 20 there is selected a second image region 15 for which an extracted feature corresponds optimally to the feature extracted for the first image region 14.

By comparing the image positions 16, 17 of the image regions 14, 15 a translation vector 18 that relates these image positions 16, 17 is finally determined.

In order to be able to apply the determined translation vector 18 to the assigned IR images 10, 11, there is stored in the thermal imaging camera 1 a correspondence 23 between the pixels of the first VIS image 19 and of the first IR image 10, or between the second VIS image 20 and the second IR image 11, it being possible to use said correspondence 23 to transform the translation vector 18 into a corresponding translation vector for the IR images 10, 11.

By the first IR image 10 being shifted relative to the second IR image 11 by this translation vector thus determined, it is possible, as described, to superpose the pictures 12, 13 completely or approximately.

As indicated by the grid line 24, the IR images 10, 11 or VIS images 19, 20 have been rectified in the inventive image processing method in order to correct perspective distortions that can lead to measuring errors.

The inventive image processing method runs continuously in the thermal imaging camera 1, new IR images 10, 11 or VIS images 19, 20 being recorded during the evaluation and processing of already recorded images, and fed to the processing.

It is possible in this way to process film sequences of IR images 10, 11 in real time and output them to the indicator unit 5.

In the case of the inventive thermal imaging camera 1, the indicator unit 5 can be designed as a touch sensitive display so that the first image region 14 can be selected manually by marking on said touch sensitive display.

The touch sensitive display and/or the control elements 6 can be used to additionally limit the image region to be examined in the IR images 10, 11, in order to improve the accuracy.

In the case of the thermal imaging camera 1, it is proposed to use a feature analysis to extract features from a sequence of at least two IR images 10, 11, or of VIS images 19, 20 assigned thereto, and to determine an optimal correspondence between features extracted from the images 9, 10, 19, 20, and to determine for the image positions 16, 17 of the corresponding features a translation vector 18 that relates the pixels of the first IR image 10 to pixels of the second IR image 11.

The invention claimed is:

1. An image processing method for a sequence of IR images (10, 11), recorded by a thermal imaging camera (1), the sequence comprising at least a first IR image (10) and a second IR image (11), the first IR image (10) being assigned to a first instant, and the second IR image (11) being assigned to a second, later instant, the method comprising recording a first VIS image (19) in a visible spectral region with an additional VIS camera (4), of a scene at the first instant, recording a second VIS image (20) in the visible spectral region with the VIS camera (4), of the scene at the second instant, the first VIS image (19) being recorded simultaneously or virtually simultaneously with the first IR image (10), and the second VIS image (20) being recorded simultaneously or virtually simultaneously with the second IR image (11), selecting a first image region (14) in the first VIS image (19), extracting at least one feature from the first VIS image (19) for the first image region (14), determining and selecting a second image region (15) in the second VIS image (20) using at least one of a feature or pattern recognition algorithm such that for the selected second image region (15) a correspondence of at least one extracted feature to the at least one feature extracted in relation to the first image region (14) is optimal, and determining by a comparison of an image position (16) of the first image region (14) in the first VIS image (19) with an image position (17) of the second VIS image region (15) in the second VIS image a VIS translation vector (18) that relates at least one pixel of the first IR image (10) to at least one pixel in the second IR image (11), and using a stored correspondence between the pixels of the first VIS image (19) and of the first IR image (10), or of the second VIS image (20) and the second IR image (11) in order to convert the VIS translation vector into a corresponding IR translation vector that relates at least one pixel of the first IR image (10) to at least one pixel in the second IR image (11), and shifting the first IR image (10) relative to the second IR image (11) by the IR translation vector such that the pictures (12, 13) of the IR images (10, 11) are superposed, wherein the sequence comprises a third IR image, the third IR image being assigned to a third instant that is later in time than the second instant, a third VIS image of a scene is produced at the third instant, and there is selected in the second VIS image (20) a new first image region that is derived from the previously determined second image region (15) of the second VIS image (20), for the new first image region at least one feature is extracted from the second VIS image (20), a new second image region is determined and selected in the third VIS image using the at least one of the feature or pattern recognition algorithm such that for the selected new second image region a correspondence of at least one feature to the at least one feature extracted in relation to the new first image region is optimal, and there is determined by a comparison of the image position of the new first image region in the second VIS image (20) with the image position of the new second image region in the third VIS image a new IR translation vector that relates at least one pixel of the second IR image (20) to at least one pixel in the third IR image.

2. The image processing method as claimed in claim 1, wherein an optimal correspondence is detected when a probability function exceeds a prescribed threshold value.

3. The image processing method as claimed in claim 1, wherein the sequence of IR images (10, 11) is formed from frames of a film sequence.

4. The image processing method as claimed in claim 1, wherein the new first image region in the second VIS image (20) is identical to the previously determined second image region (15) in the second VIS image (20).

5. The image processing method as claimed in claim 1, wherein a sequence of at least two temperature values or of at least one temperature difference value is determined and output in relation to pixels from the respective IR images (10, 11) related by the IR translation vectors.

6. The image processing method as claimed in claim 1, wherein at least one of the first (19) and the second (20) images or the IR image (10, 11), are rectified before the feature extraction.

7. The image processing method as claimed in claim 1, wherein a superposition of the first IR image (10) is at least one of generated or output with the second IR image (11) shifted relative to the first IR image (10) by the IR translation vector (18).

8. A thermal imaging camera (1) comprising an image processor (9) that is set up to execute an image processing method as claimed in claim 1.

9. The image processing method of claim 1, wherein the selection of the second image region (15) is executed simultaneously with the recording of further IR images (10, 11) of the sequence.

* * * * *